(12) United States Patent
Gao et al.

(10) Patent No.: US 11,507,748 B2
(45) Date of Patent: Nov. 22, 2022

(54) METHOD AND APPARATUS FOR OUTPUTTING INFORMATION

(71) Applicant: BEIJING BAIDU NETCOM SCIENCE AND TECHNOLOGY CO., LTD., Beijing (CN)

(72) Inventors: Yuan Gao, Beijing (CN); Dai Dai, Beijing (CN); Xinyan Xiao, Beijing (CN)

(73) Assignee: Beijing Baidu Netcom Science and Technology Co., Ltd., Beijing (CN)

( * ) Notice: Subject to any disclaimer, the term of this patent is extended or adjusted under 35 U.S.C. 154(b) by 171 days.

(21) Appl. No.: 16/896,465

(22) Filed: Jun. 9, 2020

(65) Prior Publication Data
US 2021/0200951 A1  Jul. 1, 2021

(30) Foreign Application Priority Data

Dec. 27, 2019  (CN) .......................... 201911378383.5

(51) Int. Cl.
*G06F 40/295* (2020.01)
*G06F 40/242* (2020.01)

(52) U.S. Cl.
CPC .......... *G06F 40/295* (2020.01); *G06F 40/242* (2020.01)

(58) Field of Classification Search
None
See application file for complete search history.

(56) References Cited

U.S. PATENT DOCUMENTS

| | | | |
|---|---|---|---|
| 10,997,223 B1* | 5/2021 | Christodoulopoulos | G06F 40/295 |
| 11,354,506 B2* | 6/2022 | Fei | G06F 17/18 |
| 2017/0228361 A1* | 8/2017 | Zhang | G06F 16/313 |
| 2020/0097809 A1* | 3/2020 | Velasco | G06F 40/30 |

(Continued)

FOREIGN PATENT DOCUMENTS

| CN | 107977361 A | 5/2018 |
|---|---|---|
| CN | 109388795 A | 2/2019 |

(Continued)

OTHER PUBLICATIONS

Wei, Hao, Mingyuan Gao, Ai Zhou, Fei Chen, Wen Qu, Chunli Wang, and Mingyu Lu. "Named entity recognition from biomedical texts using a fusion attention-based BiLSTM-CRF." IEEE Access 7 (2019): 73627-73636. (Year: 2019).*

(Continued)

*Primary Examiner* — Frank D Mills
(74) *Attorney, Agent, or Firm* — Nixon Peabody LLP (57) ABSTRACT

Embodiments of the present disclosure provide methods and apparatus for outputting information. The method may include: obtaining a sentence to be identified; Performing word segmentation on the to be identified sentence to obtain a word sequence; Inputting a word sequence into a pre-trained multi-task element recognition model based on sequence labeling and entity word prediction, and outputting the identified entity words, entity categories and entity word positions, where the multi-task element recognition model includes a sequence labeling network for performing sequence labeling tasks and an entity word predicting network for performing entity word predicting task, and the sequence labeling network is fused with the entity word predicting network through a fusion module.

18 Claims, 4 Drawing Sheets

(56) References Cited

U.S. PATENT DOCUMENTS

| | | | |
|---|---|---|---|
| 2021/0034701 A1* | 2/2021 | Fei | G06N 3/02 |
| 2021/0216715 A1* | 7/2021 | Wang | G06N 3/0454 |
| 2022/0075944 A1* | 3/2022 | Du | G06F 40/295 |

FOREIGN PATENT DOCUMENTS

| | | |
|---|---|---|
| CN | 109657230 A | 4/2019 |
| CN | 110147551 A | 8/2019 |
| JP | 2015176355 A | 10/2015 |
| JP | 2016126748 A | 7/2016 |

OTHER PUBLICATIONS

Chen, Yao, Changjiang Zhou, Tianxin Li, Hong Wu, Xia Zhao, Kai Ye, and Jun Liao. "Named entity recognition from Chinese adverse drug event reports with lexical feature based BiLSTM-CRF and tri-training." Journal of biomedical informatics 96 (2019): 103252. (Year: 2019).*

D. Dai et al.; "Joint Extraction of Entities and Overlapping Relations Using Position-Attentive Sequence Labeling"; Thirty-Third AAAI Conference on Artificial Intelligence; Jul. 17; 2019; pp. 6300-6308 (10 pages).

Kai Xu et al.; "Document-level attention-based biLSTM-CRF incorporating disease dictionary for disease named entity recognition"; Computers in Biology and Medicine, vol. 108, pp. 12-132; Apr. 1, 2019 (12 pages).

S. Sukhbaatar et al.; "End-To-End Memory Networks"; retrieved from arXiv:1503:08895v5 [cs.NE]; Nov. 24, 2015 (11 pages).

Li Wei et al.; "Combining CRF and rule based medical named entity recognition"; Application Research of Computers, vol. 32, No. 4, pp. 1082-1086; in Chinese only (English translation not available); Apr. 2015 (5 pages).

Zhiheng Huang et al.; "Bidirectional LSTM-CRF Models for Sequence Tagging"; retrieved from arXiv:1508:01991v1 [cs.CL]; Aug. 9, 2015 (10 pages).

Wei Jia et al.; "ARNOR: Attention Regularization based Noise Reduction for Distant Supervision Relation Classification"; Proceedings of the 57 Annual Meeting of the Association for Computational Linguistics, pp. 1399-1408; Florence, Italy, Jul. 28-Aug. 2, 2019 (11 pages).

Yao Chen et al.; "Named entity recognition from Chinese adverse drug event reports with lexical feature based BiLSTM-CRF and tri-training"; J. Biomedical Informatics, vol. 96, 103252, Jul. 16, 2019 (9 pages).

Han Pu et al., "Named entity recognition from Chinese medical records based on deep learning and multi-feature fusion"; Journal of Nanjing University, vol. 55, No. 6, pp. 942-951; in Chinese, with English translation of Abstract only; Nov. 2019 (10 pages).

\* cited by examiner

METHOD AND APPARATUS FOR OUTPUTTING INFORMATION

CROSS-REFERENCE TO RELATED APPLICATIONS

This application claims priority to Chinese Patent Application No. 201911378383.5, filed on Dec. 27, 2019, titled "Method and apparatus for outputting information," which is hereby incorporated by reference in its entirety.

TECHNICAL FIELD

Embodiments of the present disclosure relate to the field of computer technology, and inure particularly, to a method and apparatus for outputting information.

BACKGROUND

Field element recognition technology is a natural language processing technology that solves the recognition and labeling of elements (important entities) or key attributes contained in a natural language text in a professional field (medical treatment, law, finance, etc.). For example, in the medical scene of medical record text processing, it is desirable to extract elements such as disease, symptom, surgery, and examination that are concerned by a doctor: a patient suffers from a coronary heart disease [disease], and after coronary artery bypass grafting [operation], it should be considered that there may be an atypical myocardial infarction [disease], except that the diagnosis should be performed by electrocardiogram [examination] and myocardial injury marker [examination].

Field element recognition techniques may be used for natural language understanding and structuring in various professional fields, providing the most basic support for all subsequent decisions, such as: 1. Medical field: domain element recognition technology, as a core module of CDSS (Clinical Decision Support System), is used to extract key entities in medical records, providing an important capability of text understanding for subsequent disease reasoning; 2. Financial field: field element recognition techniques may be used to analyze listed company finances, and key entities in these texts (such as company name, time to market, financing history) may ultimately be used in financial aid decision-making products such as smart investment research.

There are two mainstream practices in the industry at present. One practice is using a pure rule to label domain elements; and the other practice is labeling using a rule+ model.

Existing domain element recognition systems based on the rule and rule+model have the following disadvantages.

1) The field element recognition system using a pure rule is weak in generalization and can only identify elements covered by existing rules.

2) The establishment of the rule system requires a lot of energy of the engineers. A perfect domain rule system requires many years of deep tillage fields for the engineers and analyzes and solves the problems of the system.

3) The existing model-based domain element recognition system requires a large amount of manual labeling data. Labeling in the professional field is generally done by professionals in the professional field, and labeling costs are very high, and labeling costs are about 5 to 10 times higher than those of ordinary labeling.

SUMMARY

Embodiments of the present disclosure provide a method and apparatus for outputting information.

According to a first aspect, an embodiment of the present disclosure provides a method for outputting information, including: acquiring a to be identified sentence; performing word segmentation on the to be identified sentence to obtain a word sequence; and inputting the word sequence into a pre-trained multi-task element recognition model based on sequence labeling and entity word predicting, and outputting identified entity words, entity categories and entity word positions, where the multi-task element recognition model comprises a sequence labeling network and an entity word predicting network, where the sequence labeling network is used for performing a sequence labeling task, the entity word predicting network is used for performing an entity word predicting task, and the sequence labeling network is fused with the entity word predicting network through a fusion module;

In some embodiments, the multi-task element recognition model is trained by: acquiring a training sample set, where a training sample includes a sample word sequence obtained by word segmentation of a sample sentence, and labeling information for characterizing an entity word, an entity category, and an entity word position in the sample sentence; and using the sample word sequence and the labeling information in a training sample in the training sample set as an input and an expected output of an initial multi-task element recognition model, respectively, and learning the sequence labeling task and the entity word predicting task by using a multi-task machine learning method to obtain a trained multi-task element recognition model.

In some embodiments, the sequence labeling network includes an embedding layer, a context coding layer, and a CRF layer, and the entity word predicting network includes a memory network, a dictionary representation layer, and a dictionary generation layer; and the learning the sequence labeling task and the entity word predicting task by using a multi-task machine learning method to obtain a trained multi-task element recognition model includes: selecting a training sample from the training sample set, and performing following training: converting a sample word sequence in the selected training sample into a word vector sequence through the embedding layer, and converting the word vector sequence into a context vector sequence through the context coding layer; converting the sample word sequence into a dictionary vector sequence through a pre-trained memory network; fusing the context vector sequence and the dictionary vector sequence through a fusion module to obtain a fused vector sequence; fully connecting the fused vector sequence with the context vector sequence after passing through the dictionary representation layer, and then labeling the sequence through the CRF layer to obtain a sequence labeling result; performing entity word predicting on an output of the dictionary representation layer through the dictionary generation layer to obtain an entity word prediction result; and adjusting parameters of the embedding layer, the context coding layer, the dictionary representation layer, the CRF layer, and the dictionary generation layer based on a difference between the sequence labeling result and the labeling information in the training sample and a difference between the entity word prediction result and the labeling information in the training sample, and training a multi-task element recognition model.

In some embodiments, the acquiring a training sample set includes: acquiring an unstructured/semi-structured document; performing sentence segment on the document; and or each clause, performing word segmentation on the clause to obtain a word sequence, and performing entity labeling on the clause by a rule matching method to obtain an entity word, an entity category and an entity word position of the clause as labeling information.

In some embodiments, the converting the sample word sequence into a dictionary vector sequence through a pre-trained memory network includes: matching each sample word in the sample word sequence with a dictionary stored in the memory network to obtain a dictionary vector corresponding to at least one related word of each sample word; for each sample word in the sample word sequence, fusing the dictionary vector corresponding to at least one related word of the sample word into a dictionary vector of the sample word through an attention mechanism; and forming the dictionary vector of each sample word in the sample word sequence into a dictionary vector sequence of the sample word sequence.

In some embodiments, the dictionary generation layer is a pre-trained classification model.

According to a second aspect, an embodiment of the present disclosure provides an apparatus for outputting information, including: an acquisition unit configured to acquire a to be identified sentence; a word segmentation unit configured to perform word segment on the to be identified sentence to obtain a word sequence; and an output unit configured to input the word sequence into a pre-trained multi-task element recognition model based on sequence labeling and entity word predicting, and output identified entity words, entity categories, and entity word positions, where the multi-task element recognition model comprises a sequence labeling network for performing a sequence labeling task and an entity word predicting network for performing an entity word predicting task, he sequence labeling network is fused with the entity word predicting network through a fusion module.

In some embodiments, the apparatus further includes a training unit configured to: acquire a training sample set, where a training sample includes a sample word sequence obtained by word segmentation of a sample sentence and labeling information for characterizing an entity word, an entity category, and an entity word position in the sample sentence; and use a sample word sequence and the labeling information in a training sample in the training sample set as an input and an expected output of an initial multi-task element recognition model, respectively, and learn the sequence labeling task and the entity word predicting task by using a multi-task machine learning apparatus to obtain a trained multi-task element recognition model.

In some embodiments, the he sequence labeling network is fused with the entity word predicting network through a fusion module includes an embedding layer, a context coding layer, a CRF layer, and the entity word predicting network includes a memory network, a dictionary representation layer, and a dictionary generation layer. The training unit is further configured to: select a training sample from the training sample set, and perform following training: converting a sample word sequence in the selected training sample into a word vector sequence through the embedding layer, and converting the word vector sequence into a context vector sequence through the context coding layer; converting the sample word sequence into a dictionary vector sequence through a pre-trained memory network; fusing the context vector sequence and the dictionary vector sequence through a fusion module to obtain a fused vector sequence; fully connecting the fused vector sequence with the context vector sequence after passing through the dictionary representation layer, and then labeling the sequence through the CRF layer to obtain a sequence labeling result; performing entity word predicting on an output of the dictionary representation layer through the dictionary generation layer to obtain an entity word prediction result; and adjusting parameters of the embedding layer, the context coding layer, the dictionary representation layer, the CRF layer, and the dictionary generation layer based on a difference between the sequence labeling result and the labeling information in the training sample and a difference between the entity word prediction result and the labeling information in the training sample, and training a multi-task element recognition model.

In some embodiments, the training unit is further configured to: acquire an unstructured/semi-structured document; perform sentence segment on the document; and for each clause, perform word segmentation on the clause to obtain a word sequence, and perform entity labeling on the clause by a rule matching method to obtain an entity word, an entity category and an entity word position of the clause as labeling information.

In some embodiments, the training unit is further configured to: match each sample word in the sample word sequence with a dictionary stored in the memory network to obtain a dictionary vector corresponding to at least one related word of each sample word; for each sample word in a sample word sequence, fuse a dictionary vector corresponding to at least one related word of the sample word into a dictionary vector of the sample word through an attention mechanism; and form a dictionary vector of each sample word in the sample word sequence into a dictionary vector sequence of the sample word sequence.

In some embodiments, the dictionary generation layer is a pre-trained classification model.

According to a third aspect, an embodiment of the present disclosure provides an electronic device including one or more processors; and a storage apparatus storing one or more programs, where the one or more programs, when executed by the one or more processors, cause the one or more processors to implement the method of any embodiment in the first aspect.

According to a fourth aspect, an embodiment of the present disclosure provides a computer readable medium, storing a computer program thereon, wherein the program, when executed by a processor, implements the method of any embodiment in first aspect.

The method and apparatus for outputting information provided in embodiments of the present disclosure may incorporate existing domain knowledge in a global and local manner. Global means that a multi-task element recognition model based on sequence labeling and entity word predicting may model the context of the occurrence entity, and may predict the occurrence entity words and corresponding categories through the context. Local information refers to the memory network. Here the memory network stores dictionary candidate words (partial information of the dictionary, only partial words) which have a semantic association with the current word.

BRIEF DESCRIPTION OF THE DRAWINGS

After reading detailed descriptions of non-limiting embodiments given with reference to the following accompanying drawings, other features, objectives and advantages of the present disclosure will be more apparent.

DETAILED DESCRIPTION

The present disclosure is described in further detail below with reference to accompanying drawings and examples. It is to be understood that specific embodiments described herein are merely illustrative of the related disclosure and are not restrictive of the disclosure. It is also to be noted that, for ease of description, only parts related to the disclosed embodiments are shown in the drawings.

It is noted that embodiments in the present disclosure and features in the embodiments may be combined with each other without conflict. The present disclosure will now be described in detail with reference to the accompanying drawings and examples.

Figure 1:
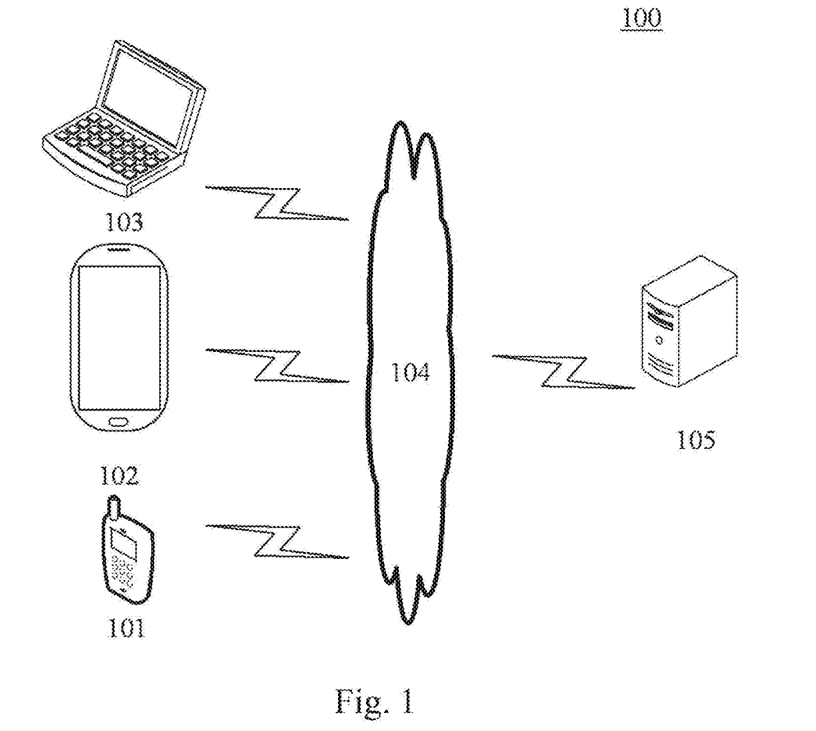
FIG. 1 is an example system architecture diagram in which an embodiment of the present disclosure may be applied.

FIG. 1 illustrates an example system architecture 100 in which a method for outputting information or an apparatus for outputting information of an embodiment or the present disclosure may be applied.

As shown in FIG. 1, the system architecture 100 may include terminal devices 101, 102, 103, a network 104, and a server 105. The network 104 serves as a medium for providing a communication link between the terminal devices 101, 102, 103 and the server 105. Network 104 may include various types of connections, such as wired, wireless communication links, or fiber optic cables, and the like.

The user may interact with the server 105 through the network 104 using the terminal devices 101, 102, 103 to receive or send messages, etc. The terminal devices 101, 102, and 103 may be provided with various communication client applications, such as domain element identification applications, web browser applications, shopping applications, search applications, instant messaging tools, mailbox clients, social platform software, and the like.

The terminal devices 101, 102, 103 may be hardware or software. When the terminal devices 101, 102, 103 are hardware, they may be various electronic devices having a display screen and supporting text browsing, including but not limited to a smartphone, a tablet computer, an electronic book reader, an MP3 player (Moving Picture Experts. Group Audio Layer III), a MP4 (Moving Picture Experts Group Audio Layer IV) player, a laptop portable computer, a desktop computer, and the like. When the terminal devices 101, 102, and 103 are software, they may be installed in the electronic devices listed above. It may be implemented as a plurality of pieces of software or software modules (e.g., for providing distributed services) or as a single piece of software or software module. It is not specifically limited herein.

The server 105 may be a server providing various services, such as a background labeling server providing domain labeling service support for text displayed on the terminal devices 101, 102, 103. The background web server may perform processing such as analysis on the received data including the labeling request of the to be identified sentence, and feed back the processing result (e.g., the identified entity word, entity category, and entity word position) to the terminal device.

It should be noted that the server may be hardware or software. When the server is hardware, a distributed server cluster composed of multiple servers may be implemented, or a single server may be implemented. When the server is software, it may be implemented as a plurality of pieces of software or software modules (e.g., a plurality of pieces of software or software modules for providing distributed services), or it may be implemented as a single piece of software or software module. It is not specifically limited herein.

It should be noted that the method for outputting information provided in embodiments of the present disclosure is generally performed by the server 105, and accordingly, the apparatus for outputting information is generally provided in the server 105.

t should be understood that the number of terminal devices, networks and servers in FIG. 1 is merely illustrative. There may be any number of terminal devices, networks, and servers as desired for implementation.

Figure 2:
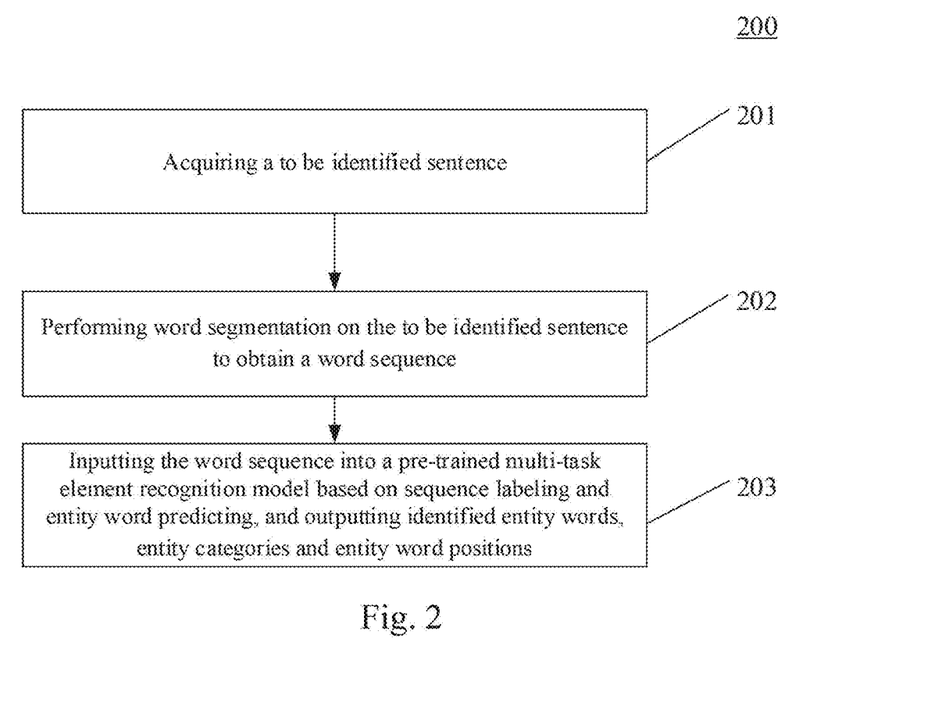
FIG. 2 is a flowchart of a method for outputting information according to an embodiment of the present disclosure.

With continuing reference to FIG. 2, a flow 200 of a method for outputting information in accordance with an embodiment of the present disclosure is shown. The method for outputting information includes the following steps.

Step 201: acquiring a to be identified sentence.

In the present embodiment, an executing body of a method for outputting information (for example, a server shown in FIG. 1) may receive a to be identified sentence from a terminal with which a user identifies a domain element by means of a wired connection or a wireless connection.

Step 202, performing word segmentation on the to be identified sentence to obtain a word sequence.

In the present embodiment, the word segmentation may be performed by a conventional word segmentation method, for example, a maximum reverse matching method or the like. For example, the sentence "a patient suffers from a coronary heart disease, and after coronary artery bypass grafting, it should be considered that there may be an atypical myocardial infarction, except that the diagnosis should be performed by electrocardiogram and myocardial injury marker" is cut into a word sequence {a patient, suffers from, a coronary heart disease, and after, coronary artery bypass grafting, it should be, considered that, there may be, an atypical myocardial infarction, except that, the diagnosis should be performed by, electrocardiogram, and, myocardial injury marker}.

Step 203, inputting the word sequence into a pre-trained multi-task element recognition model based on sequence labeling and entity word predicting, and outputting identified entity words, entity categories and entity word positions.

In the present embodiment, the multi-task element recognition model includes a sequence labeling network and an entity word predicting network. The sequence labeling network may be BILSTM-CRF (biLSTM, refers to bidirectional LSTM (Long Short-Term Memory); CRF refers to a conditional random field) network or the like that may be used to perform a sequence labeling task. The entity word predicting network is used to perform an entity word predicting task. The BILSTM-CRF network may be fused with the entity word predicting network through a fusion module after the hidden layer of the LSTM.

Figure 3A:
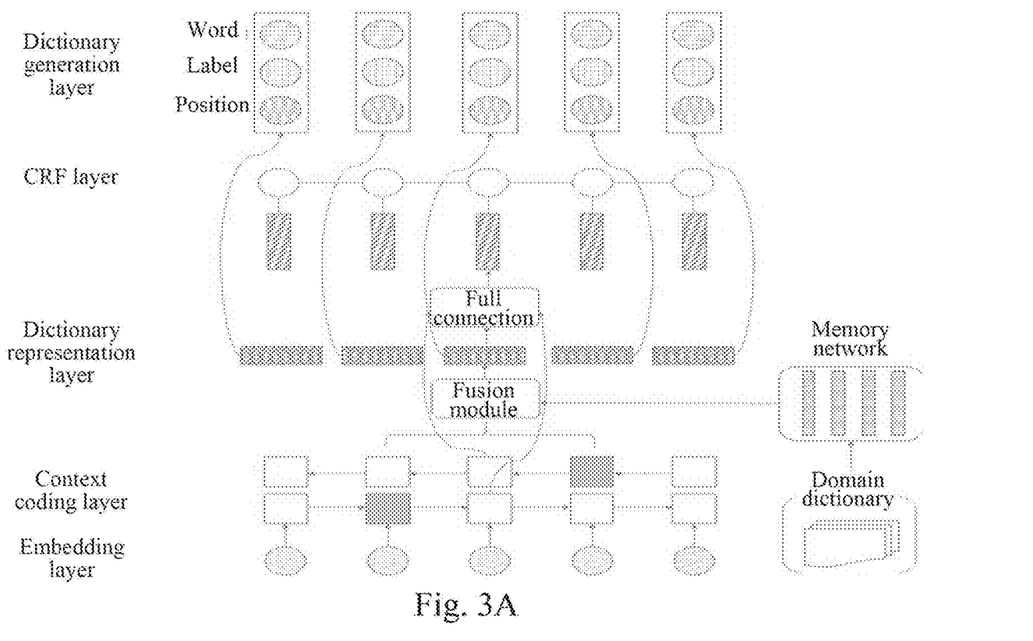
FIG. 3A is a network architecture diagram of a multi-task element recognition model for a method for outputting information according to an embodiment of the present disclosure.

As shown in FIG. 3A, after the word sequence enters the multi-task element recognition model, the following steps are performed.

Step 301, converting the word sequence into a word vector sequence through an embedding layer.

In the present embodiment, the embedding layer is essentially a word2vec, and the data is dimensionally reduced, while the synonyms (the distances between the respective words) can be easily calculated. For each word, we need to construct a vector to obtain the meaning of the word and some features useful for entity recognition, the vector being stacked from Glove trained word vectors and vectors that extract features from letters. One option is to use manually extracted features, such as whether a word starts with a capital letter or the like. Another better option is to use some kind of neural network to automatically extract features. Here, bi-LSTM is used for a single letter, although other recurrent neural networks may be used, or CNN may be used for a single letter or n-gram.

Step 302, converting the word vector sequence into a context vector sequence through a context coding layer.

In this embodiment, after obtaining the final vector representation of the word, the sequence of word vectors is subjected to LSTM or bi-LSTM. This time, the hidden state of each time point, not just the final state, is used. M word vectors are input to obtain M vectors of hidden state, however, the word vectors only contain word-level information, and the vectors of hidden state take context into account.

Step 303, converting the sample word sequence into a dictionary vector sequence through a pre-trained memory network.

In the present embodiment, memory networks (MemNN for short). The memory network model obtains an answer (dictionary vector sequence) corresponding to a question by mathematical transformation of a context set S (domain dictionary) and the question q (sample word sequence). The specific steps are as follows.

1. A single inference, as shown in the left diagram (a) of FIG. 3B.

Figure 3B:
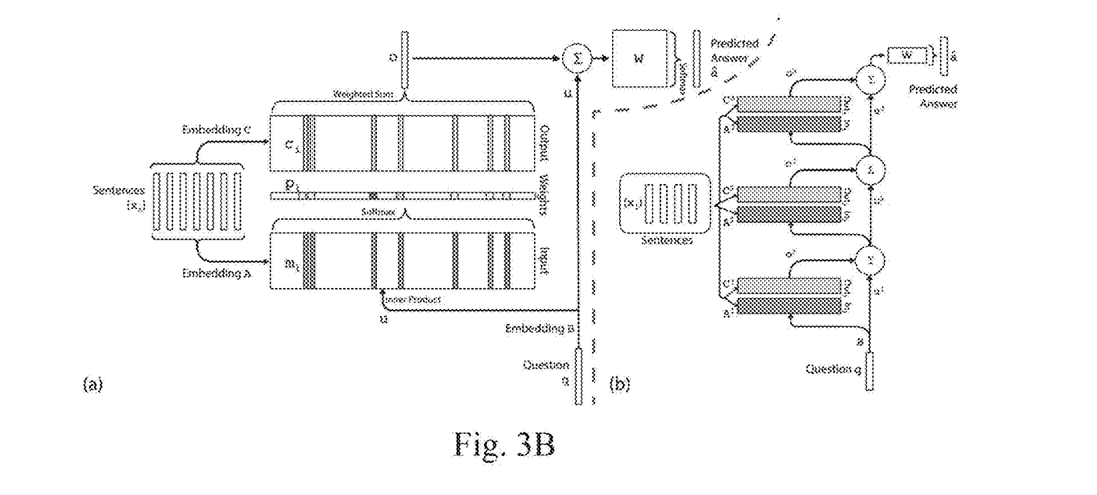
FIG. 3B is a network architecture diagram of a memory network of a multi-task element recognition model of a method for outputting information according to an embodiment of the present disclosure.

Perform embedding on the words in the domain dictionary to transform them into vectors and put the vectors into the memory m.

Perform the same embedding on the problem q to transform it into the vector u.

The matching degree between u and memory in is calculated.

$p_i = \text{Softmax}(u^T n_i)$

Output o: weighted, sum of memory m $$o = \sum_i p_i c_i.$$

Predicting the answer with o and question u $\hat{a} = \text{Softmax}(W(o+u))$

2. Multiple inference: as shown in the right diagram (b) of FIG. 3B.

Each update:

$u^{k+1} = u^k + o^k$

After several inferences, the output is calculated:

$$\hat{a} = \text{Softmax}(Wu^{K+1}) = \text{Softmax}(W(o^K + u^K))$$

Alternatively, a vector representation of the domain dictionary and the sample word sequence may be calculated first, and then an Attention mechanism is triggered according to the sample word sequence, words in the domain dictionary associated with the sample word sequence are selected using a gating method. A context memory module then performs iteration to generate memory in conjunction with the relevant domain dictionary and sample word sequence, and generate a vector representation of an answer.

Step 304: fusing the context vector sequence and the dictionary vector sequence through a fusion module to obtain a fused vector sequence.

In the present embodiment, the context vector sequence and the dictionary vector sequence may be fused by the vector contact to obtain a fused vector sequence.

Step 305, fully connecting the fused vector sequence with the context vector sequence after passing through a dictionary representation layer.

In the present embodiment, the dictionary representation layer is a representation layer in a master network incorporating dictionary knowledge. A full connection (FC) is a layer of a neural network that is primarily used to transform representations.

Step 306: labeling the sequence through a CRF layer to obtain a sequence labeling result.

In the present embodiment, the CRF layer decodes, calculates the tag score at the decoding stage, uses the hidden state vector corresponding to each word to make a final prediction, and can use a fully connected neural network to obtain the score of each entity tag. Decoding the tag score, calculating the probability of the tag sequence, and finding the sequence with the highest probability to obtain a sequence labeling result. That is, the sequence labeling task is performed, and the entity words, the entity categories, and the entity word positions are identified.

Step 307: performing entity word predicting on an output of the dictionary representation layer through the dictionary generation layer to obtain an entity word prediction result.

In the present embodiment, the dictionary generation layer may be a classification model based on a neural network, and the output of the dictionary representation layer is classified to obtain a classification label and a probability, thereby determining the entity word, the entity category, and the entity word position.

Step 307 is used for multi-task training to improve the performance of the sequence labeling network, and step 307 may not be performed at the time of application, but only the labeling result of the sequence labeling network in step 306 is used.

The training process of the multi-task element recognition model is similar to that of steps 301-307, but it is necessary to adjust the parameters of each layer of the multi-task element recognition model for iterative training by using the difference between the entity word prediction result of step 307 and the desired labeling result, and the difference between the sequence labeling result of step 306 and the desired labeling result. The model may be trained by a server as shown in FIG. 1, or may be trained by a third-party server.

A dictionary may be used to make rule labeling of a large number of unsupervised text in the field to obtain training samples. Rule labeling refers to rule matching of inputted domain text using means such as a domain dictionary, a regular expression, and a syntax tree. For example, elements such as disease, symptom, operation, examination, that are concerned by a doctor, are extracted from the above example: a patient suffers from a coronary heart disease [disease], and after coronary artery bypass grafting [operation], it should be considered that there may be an atypical myocardial infarction [disease], except that the diagnosis should be performed by electrocardiogram [examination] and myocardial injury marker [examination].

Figure 4:
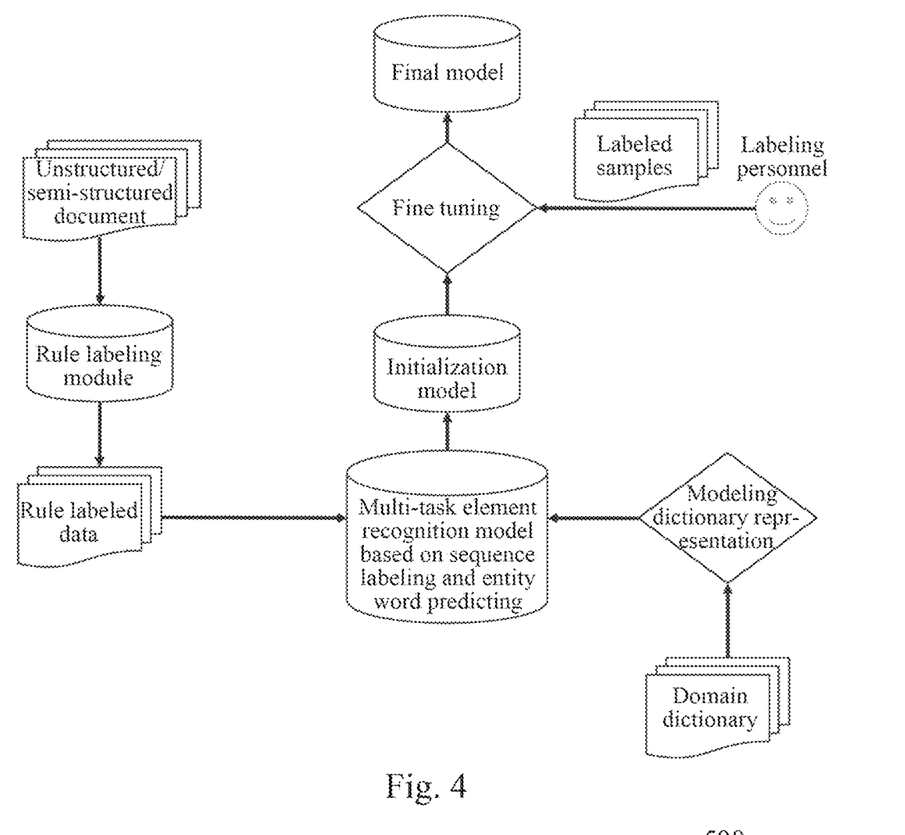
FIG. 4 is a schematic diagram of an application scenario of a method for outputting information according to an embodiment of the present disclosure.

With continued reference to FIG. 4, FIG. 4 is a schematic diagram of an application scenario of a method for outputting information according to an embodiment of the present embodiment. In the application scenario of FIG. 4, a dictionary is first used to perform rule labeling on a large number of unsupervised texts in the field, and the obtained rule labeled data is used as a training samples. There is also a need to model dictionary representation through a domain dictionary to build a memory network. And then performing multi-task learning by using the constructed memory network and the labeled training samples to obtain the initialization model. The final model is then obtained by fine tuning using manual labeling data. When the user needs to recognize the domain element, the to be identified sentence is input to the trained model, then the recognized entity words, entity categories, and entity word positions may be output.

Figure 5:
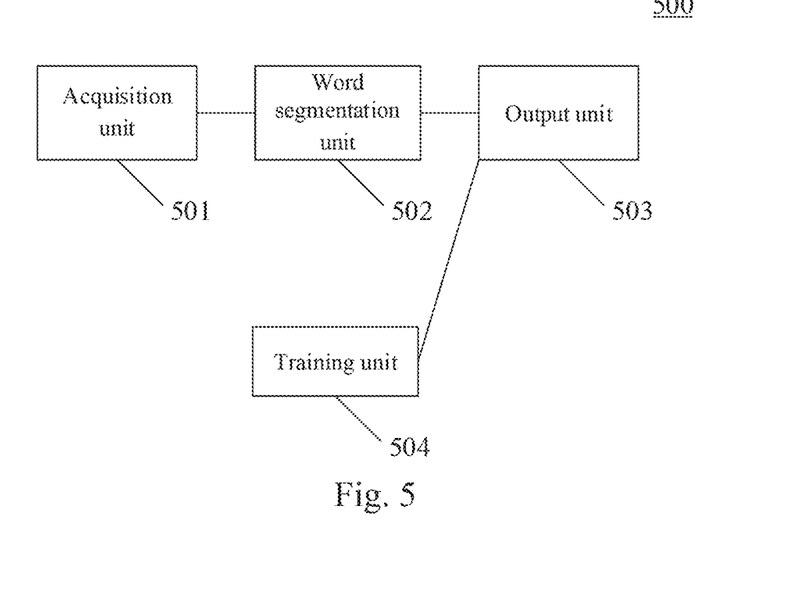
FIG. 5 is a schematic structural diagram of an apparatus for outputting information according to an embodiment of the present disclosure.

With further reference to FIG. 5, as an implementation of the method shown in each of the above figures, an embodiment of the present disclosure provides an apparatus for outputting information, the apparatus embodiment corresponds to the method embodiment shown in FIG. 2, and the apparatus is particularly applicable to various electronic devices.

As shown in FIG. 5, the apparatus 500 for outputting information in the present embodiment includes an acquisition unit 501, a word segmentation unit 502, and an output unit 503. The acquiring unit 501 is configured to acquire a to be identified sentence. The word segmentation unit 502 is configured to perform word segment on the to be identified sentence to obtain a word sequence. The output unit 503 is configured to input the word sequence into a pre-trained multi-task element recognition model based on sequence labeling and entity word predicting, and output identified entity words, entity categories, and entity word positions, where the multi-task element recognition model comprises a sequence labeling network for performing a sequence labeling task and an entity word predicting network for performing an entity word predicting task, the sequence labeling network is fused with the entity word predicting network through a fusion module.

In the present embodiment, the specific processing of the acquisition unit 501, the word segmentation unit 502, and the output unit 503 of the apparatus 500 for outputting information may refer to step 201, step 202, and step 203 in the corresponding embodiment of FIG. 2.

In some alternative implementations of the present embodiment, the apparatus 500 further includes a training unit 504 configured to acquire a training sample set, wherein a training sample comprises a sample word sequence obtained by word segmentation of a sample sentence and labeling information for characterizing an entity word, an entity category, and an entity word position in the sample sentence; and use a sample word sequence and the labeling information in a training sample in the training sample set as an input and an expected output of an initial multi-task element recognition model, respectively, and learn the sequence labeling task and the entity word predicting task by using a multi-task machine learning apparatus to obtain a trained multi-task element recognition model.

In some alternative implementations of the present embodiment, the BILSTM-CRF network includes an embedding layer, a context coding layer, and a CRF layer, and the entity word predicting network includes a memory network, a dictionary representation layer, and a dictionary generation layer. The training unit is further configured to: select a training sample from the training sample set, and perform the following training: converting a sample word sequence in the selected training sample into a word vector sequence through the embedding layer, and converting the word vector sequence into a context vector sequence through the context coding layer; converting the sample word sequence into a dictionary vector sequence through a pre-trained memory network; fusing the context vector sequence and the dictionary vector sequence through a fusion module to obtain a fused vector sequence; fully connecting the fused vector sequence with the context vector sequence after passing through the dictionary representation layer, and then labeling the sequence through the CRF layer to obtain a sequence labeling result; performing entity word predicting on an output of the dictionary representation layer through the dictionary generation layer to obtain an entity word prediction result; and adjusting parameters of the embedding layer, the context coding layer, the dictionary representation layer, the CRF layer, and the dictionary generation layer based on a difference between the sequence labeling result and the labeling information in the training sample and a difference between the entity word prediction result and the labeling information in the training sample, and training a multi-task element recognition model.

In some alternative implementations of the present embodiment, the training unit is further configured to acquire an unstructured/semi-structured document; perform sentence segment on the document; and for each clause, perform word segmentation on the clause to obtain a word sequence, and perform entity labeling on the clause by a rule matching method to obtain an entity word, an entity category and an entity word position of the clause as labeling information.

In some alternative implementations of the present embodiment, the training unit is further configured to: match each sample word in the sample word sequence with a dictionary stored in the memory network to obtain a dictionary vector corresponding to at least one related word of each sample word; for each sample word in the sample word sequence, fuse a dictionary vector corresponding to at least one related word of the sample word into a dictionary vector of the sample word through an attention mechanism; and form the dictionary vector of each sample word in the sample word sequence into a dictionary vector: sequence of the sample word sequence.

In some alternative implementations of the present embodiment, the dictionary generation layer is a pre-trained classification model.

Figure 6:
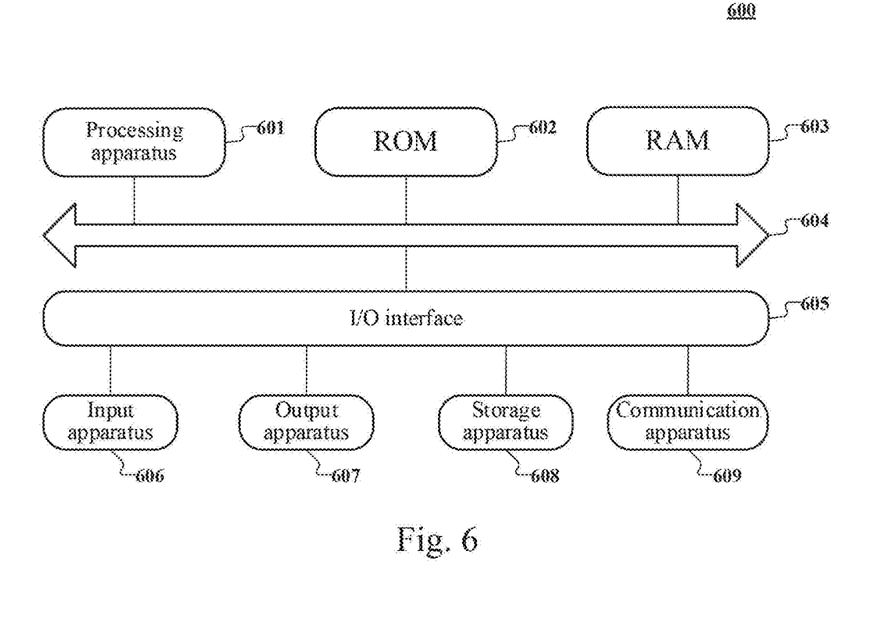
FIG. 6 is a schematic structural diagram of a computer system suitable for implementing an electronic device of embodiments of the present disclosure.

Referring to FIG. 6, FIG. 6 is a schematic structural diagram of an electronic device (such as the server as shown in FIG. 1) 600 adapted to implement embodiments of the present disclosure. The electronic device 600 shown in FIG.

6 is merely an example, and should not bring any limitations to the functions and the scope of use of embodiments of the present disclosure.

As shown in FIG. 6, the electronic device 600 may include a processing apparatus (e.g., a central processing unit and a graphics processing unit) 601, which may execute various appropriate actions and processes in accordance with a program stored in a read-only memory (ROM) 602 or a program loaded into a random access memory (RAM) 603 from a storage apparatus 608. The RAM 603 also stores various programs and data required by operations of the system 600. The processing apparatus 601, the ROM 602 and the RAM 603 are connected to each other through a bus 604. An input/output (110) interface 605 is also connected to the bus 604.

Generally, the following apparatuses are connected to the I/O interface 605: an input apparatus 606 including, for example, a touch screen, a touch pad, a keyboard, and a mouse, a camera, a microphone, an accelerometer and a gyroscope; an output apparatus 607 including, for example, a liquid crystal display (LCD), a speaker and a vibrator; the storage apparatus 608 including, for example, a hard disk; and a communication apparatus 609. The communication apparatus 609 may allow the electronic device 600 to exchange data with other devices by means of a wireless communication or wired communication. Although FIG. 6 illustrates the electronic device 600 having various apparatuses, it should be understood that it is not required to implement or possess all of the shown apparatuses. More or fewer apparatuses may alternatively be implemented or possessed. Each block shown in FIG. 6 may represent one apparatus, or may represent a plurality of apparatuses as needed.

In particular, according to embodiments of the present disclosure, the process described above with reference to the flow chart may be implemented in a computer software program. For example, an embodiment of the present disclosure includes a computer program product, which includes a computer program that is tangibly embedded in a machine-readable medium. The computer program includes program codes for executing the method as illustrated in the flow chart. In such an embodiment, the computer program may be downloaded and installed from a network via the communication apparatus 609, or may be installed from the storage apparatus 608, or may be installed from the ROM 602. The Computer program, when executed by the processing apparatus 601, implements the functions as defined by the methods of the present disclosure. It should be noted that the computer readable medium in the present disclosure may be computer readable signal medium or computer readable storage medium or any combination of the above two. An example of the computer readable storage medium may include, but not limited to: electric, magnetic, optical, electromagnetic, infrared, or semiconductor systems, apparatus, elements, or a combination of any of the above. A more specific example of the computer readable storage medium may include but is not limited to: electrical connection with one or more wire, a portable computer disk, a hard disk, a random access memory (RAM), a read only memory (ROM), an erasable programmable read only memory (EPROM or flash memory), a fibre, a portable compact disk read only memory (CD-ROM), an optical memory, a magnet memory or any suitable combination of the above. In the present disclosure, the computer readable storage medium may be any tangible medium containing or storing programs which may be used by a command execution system, apparatus or element or incorporated thereto. In the present disclosure, the computer readable signal medium may include data signal in the base band or propagating as parts of a carrier, in which computer readable program codes are carried. The propagating data signal may take various forms, including but not limited to: an electromagnetic signal, an optical signal or any suitable combination of the above. The signal medium that can be read by computer may be any computer readable medium except for the computer readable storage medium. The computer readable medium is capable of transmitting, propagating or transferring programs for use by, or used in combination with, a command execution system, apparatus or element. The program codes contained on the computer readable medium may be transmitted with any suitable medium including but not limited to: wireless, wired, optical cable, RF medium etc., or any suitable combination of the above.

The computer readable medium may be the computer readable medium included in the electronic device, or a stand-alone computer readable medium not assembled into the electronic device. The computer readable medium carries one or more programs. The one or more programs, when executed by the electronic device, cause the electronic device to: acquire a to be identified sentence; performing word segmentation on the to be identified sentence to obtain a word sequence; and input the word sequence into a pre-trained multi-task element recognition model based on sequence labeling and entity word predicting, and output identified entity words, entity categories and entity word positions, where the multi-task element recognition model includes a sequence labeling network and an entity word predicting network, where the sequence labeling network is used for performing a sequence labeling task, the entity word predicting network is used for performing an entity word predicting task, and the sequence labeling network is fused with the entity word predicting network through a fusion module.

A computer program code for executing operations in the present disclosure may be compiled using one or more programming languages or combinations thereof. The programming languages include object-oriented programming languages, such as Java, Smalltalk or C++, and also include conventional procedural programming languages, such as "C" language or similar programming languages. The program code may be completely executed on a user's computer, partially executed on a user's computer, executed as a separate software package, partially executed on a user's computer and partially executed on a remote computer, or completely executed on a remote computer or server. In the circumstance involving a remote computer, the remote computer may be connected to a user's computer through any network, including local area network (LAN) or wide area network (WAN), or may be connected to an external computer (for example, connected through Internet using an Internet service provider).

The flow charts and block diagrams in the accompanying drawings illustrate architectures, functions and operations that may be implemented according to the systems, methods and computer program products of the various embodiments of the present disclosure. In this regard, each of the blocks in the flow charts or block diagrams may represent a module, a program segment, or a code portion, said module, program segment, or code portion comprising one or more executable instructions for implementing specified logic functions. It should also be noted that, in some alternative implementations, the functions denoted by the blocks may occur in a sequence different from the sequences shown in the figures. For example, any two blocks presented in succession may be executed, substantially in parallel, or they may sometimes be in a reverse sequence, depending on the function involved. It should also be noted that each block in the block diagrams and/or flow charts as well as a combination of blocks may be implemented using a dedicated hardware-based system executing specified functions or operations, or by a combination of a dedicated hardware and computer instructions.

The units involved in embodiments of the present disclosure may be implemented by means of software or hardware. The described units may also be provided in a processor. For example, the processor may be described as: a processor including an acquisition unit, a word segmentation unit, and an output unit. Here, the names of these units do not in some cases constitute a limitation to such units themselves. For example, the acquisition unit may alternatively be described as "a unit for acquiring a to be identified sentence."

The above description provides an explanation of certain embodiments of the present disclosure and the technical principles used. It should be appreciated by those skilled in the art that the inventive scope of the present disclosure is not limited to the technical solutions formed by the particular combinations of the above-described technical features. The inventive scope should also cover other technical solutions formed by any combinations of the above-described technical features or equivalent features thereof without departing from the concept of the disclosure. Technical schemes formed by the above-described features being interchanged with, but not limited to, technical features with similar functions disclosed in the present disclosure are examples.

What is claimed is:

1. A method for outputting information, comprising:
   acquiring a to be identified sentence;
   performing word segmentation on the to be identified sentence to obtain a word sequence;
   inputting the word sequence into a pre-trained multi-task element recognition model based on sequence labeling and entity word predicting, wherein the multi-task element recognition model comprises a sequence labeling network and an entity word predicting network, the sequence labeling network comprises an embedding layer, a context coding layer, and a conditional random field (CRF) layer, and the entity word predicting network comprises a memory network, a dictionary representation layer, and a dictionary generation layer, and wherein the sequence labeling network is used for performing a sequence labeling task, the entity word predicting network is used for performing an entity word predicting task, and the sequence labeling network is fused with the entity word predicting network through a fusion module;
   converting the word sequence into a word vector sequence through the embedding layer, and converting the word vector sequence into a context vector sequence through the context coding layer;
   converting the sample word sequence into a dictionary vector sequence through a pre-trained memory network;
   fusing the context vector sequence and the dictionary vector sequence through the fusion module to obtain a fused vector sequence;
   fully connecting the fused vector sequence with the context vector sequence after passing through the dictionary representation layer; and
   labeling the sequence through the CRF layer to output identified entity words, entity categories and entity word positions.

2. The method of claim 1, wherein the multi-task element recognition model is trained by:
   acquiring a training sample set, wherein a training sample comprises a sample word sequence obtained by word segmentation of a sample sentence, and labeling information for characterizing an entity word, an entity category, and an entity word position in the sample sentence; and
   using the sample word sequence and the labeling information in a training sample in the training sample set as an input and an expected output of an initial multi-task element recognition model, respectively, and learning the sequence labeling task and the entity word predicting task by using a multi-task machine learning method to obtain a trained multi-task element recognition model.

3. The method of claim 2, wherein
   learning the sequence labeling task and the entity word predicting task by using a multi-task machine learning method to obtain a trained multi-task element recognition model comprises:
   selecting a training sample from the training sample set, and performing following training:
   converting a sample word sequence in the selected training sample into a word vector sequence through the embedding layer, and converting the word vector sequence into a context vector sequence through the context coding layer;
   converting the sample word sequence into a dictionary vector sequence through a pre-trained memory network;
   fusing the context vector sequence and the dictionary vector sequence through a fusion module to obtain a fused vector sequence;
   fully connecting the fused vector sequence with the context vector sequence after passing through the dictionary representation layer, and then labeling the sequence through the CRF layer to obtain a sequence labeling result;
   performing entity word predicting on an output of the dictionary representation layer through the dictionary generation layer to obtain an entity word prediction result; and
   adjusting parameters of the embedding layer, the context coding layer, the dictionary representation layer, the CRF layer, and the dictionary generation layer based on a difference between the sequence labeling result and the labeling information in the training sample and a difference between the entity word prediction result and the labeling information in the training sample, and training a multi-task element recognition model.

4. The method of claim 2, wherein the acquiring a training sample set comprises:
   acquiring an unstructured/semi-structured document;
   performing sentence segment on the document; and
   for each clause, performing word segmentation on the clause to obtain a word sequence, and performing entity labeling on the clause by a rule matching method to obtain an entity word, an entity category and an entity word position of the clause as labeling information.

5. The method of claim 3, wherein the converting the sample word sequence into a dictionary vector sequence through a pre-trained memory network comprises:
   matching each sample word in the sample word sequence with a dictionary stored in the memory network to obtain a dictionary vector corresponding to at least one related word of each sample word;

for each sample word in the sample word sequence, fusing the dictionary vector corresponding to at least one related word of the sample word into a dictionary vector of the sample word through an attention mechanism; and forming the dictionary vector of each sample word in the sample word sequence into a dictionary vector sequence of the sample word sequence.

6. The method of claim 3, wherein the dictionary generation layer is a pre-trained classification model.

7. An apparatus for outputting information, comprising:
at least one processor; and
a memory storing instructions, wherein the instructions when executed by the at least one processor, cause the at least one processor to perform operations, the operations comprising:
acquiring a to be identified sentence;
performing word segment on the to be identified sentence to obtain a word sequence;
inputting the word sequence into a pre-trained multi-task element recognition model based on sequence labeling and entity word predicting, wherein the multi-task element recognition model comprises a sequence labeling network for performing a sequence labeling task and an entity word predicting network for performing an entity word predicting task, the sequence labeling network comprises an embedding layer, a context coding layer, and a conditional random field (CRF) layer, and the entity word predicting network comprises a memory network, a dictionary representation layer, and a dictionary generation layer, and the sequence labeling network is fused with the entity word predicting network through a fusion module;
converting the word sequence into a word vector sequence through the embedding layer, and converting the word vector sequence into a context vector sequence through the context coding layer;
converting the sample word sequence into a dictionary vector sequence through a pre-trained memory network;
fusing the context vector sequence and the dictionary vector sequence through the fusion module to obtain a fused vector sequence;
fully connecting the fused vector sequence with the context vector sequence after passing through the dictionary representation layer; and
labeling the sequence through the CRF layer to output identified entity words, entity categories, and entity word positions.

8. The apparatus of claim 7, wherein the multi-task element recognition model is trained by:
acquiring a training sample set, wherein a training sample comprises a sample word sequence obtained by word segmentation of a sample sentence and labeling information for characterizing an entity word, an entity category, and an entity word position in the sample sentence; and
using a sample word sequence and the labeling information in a training sample in the training sample set as an input and an expected output of an initial multi-task element recognition model, respectively, and learning the sequence labeling task and the entity word predicting task by using a multi-task machine learning apparatus to obtain a trained multi-task element recognition model.

9. The apparatus of claim 8, wherein
learning the sequence labeling task and the entity word predicting task by using a multi-task machine learning method to obtain a trained multi-task element recognition model comprises:
selecting a training sample from the training sample set, and perform following training:
converting a sample word sequence in the selected training sample into a word vector sequence through the embedding layer, and
converting the word vector sequence into a context vector sequence through the context coding layer; converting the sample word sequence into a dictionary vector sequence through a pre-trained memory network;
fusing the context vector sequence and the dictionary vector sequence through a fusion module to obtain a fused vector sequence;
fully connecting the fused vector sequence with the context vector sequence after passing through the dictionary representation layer, and then labeling the sequence through the CRF layer to obtain a sequence labeling result;
performing entity word predicting on an output of the dictionary representation layer through the dictionary generation layer to obtain an entity word prediction result; and
adjusting parameters of the embedding layer, the context coding layer, the dictionary representation layer, the CRF layer, and the dictionary generation layer based on a difference between the sequence labeling result and the labeling information in the training sample and a difference between the entity word prediction result and the labeling information in the training sample, and training a multi-task element recognition model.

10. The apparatus of claim 8, wherein the acquiring a training sample set comprises:
acquiring an unstructured/semi-structured document;
performing sentence segment on the document; and
for each clause, performing word segmentation on the clause to obtain a word sequence, and perform entity labeling on the clause by a rule matching method to obtain an entity word, an entity category and an entity word position of the clause as labeling information.

11. The apparatus of claim 9, wherein the converting the sample word sequence into a dictionary vector sequence through a pre-trained memory network comprises:
matching each sample word in the sample word sequence with a dictionary stored in the memory network to obtain a dictionary vector corresponding to at least one related word of each sample word;
for each sample word in the sample word sequence, fusing a dictionary vector corresponding to at least one related word of the sample word into a dictionary vector of the sample word through an attention mechanism; and
forming the dictionary vector of each sample word in the sample word sequence into a dictionary vector sequence of the sample word sequence.

12. The apparatus of claim 9, wherein the dictionary generation layer is a pre-trained classification model.

13. A non-transitory computer readable medium, storing a computer program thereon, wherein the program, when executed by a processor, causes the processor to perform operations, the operations comprising:
acquiring a to be identified sentence;
performing word segment on the to be identified sentence to obtain a word sequence;

inputting the word sequence into a pre-trained multi-task element recognition model based on sequence labeling and entity word predicting, wherein the multi-task element recognition model comprises a sequence labeling network for performing a sequence labeling task and an entity word predicting network for performing an entity word predicting task, the sequence labeling network comprises an embedding layer, a context coding layer, and a conditional random field (CRF) layer, and the entity word predicting network comprises a memory network, a dictionary representation layer, and a dictionary generation layer, and the entity word predicting network is used for performing an entity word predicting task, and the sequence labeling network is fused with the entity word predicting network through a fusion module converting the word sequence into a word vector sequence through the embedding layer, and converting the word vector sequence into a context vector sequence through the context coding layer;

converting the sample word sequence into a dictionary vector sequence through a pre-trained memory network;

fusing the context vector sequence and the dictionary vector sequence through the fusion module to obtain a fused vector sequence;

fully connecting the fused vector sequence with the context vector sequence after passing through the dictionary representation layer; and labeling the sequence through the CRF layer to output identified entity words, entity categories, and entity word positions.

14. The non-transitory computer readable medium of claim 13, wherein the multi-task element recognition model is trained by:

acquiring a training sample set, wherein a training sample comprises a sample word sequence obtained by word segmentation of a sample sentence and labeling information for characterizing an entity word, an entity category, and an entity word position in the sample sentence; and using a sample word sequence and the labeling information in a training sample in the training sample set as an input and an expected output of an initial multi-task element recognition model, respectively, and learning the sequence labeling task and the entity word predicting task by using a multi-task machine learning apparatus to obtain a trained multi-task element recognition model.

15. The non-transitory computer readable medium of claim 14, wherein learning the sequence labeling task and the entity word predicting task by using a multi-task machine learning method to obtain a trained multi-task element recognition model comprises:

selecting a training sample from the training sample set, and perform following training:

converting a sample word sequence in the selected training sample into a word vector sequence through the embedding layer, and converting the word vector sequence into a context vector sequence through the context coding layer; converting the sample word sequence into a dictionary vector sequence through a pre-trained memory network;

fusing the context vector sequence and the dictionary vector sequence through a fusion module to obtain a fused vector sequence;

fully connecting the fused vector sequence with the context vector sequence after passing through the dictionary representation layer, and then labeling the sequence through the CRF layer to obtain a sequence labeling result;

performing entity word predicting on an output of the dictionary representation layer through the dictionary generation layer to obtain an entity word prediction result; and adjusting parameters of the embedding layer, the context coding layer, the dictionary representation layer, the CRF layer, and the dictionary generation layer based on a difference between the sequence labeling result and the labeling information in the training sample and a difference between the entity word prediction result and the labeling information in the training sample, and training a multi-task element recognition model.

16. The non-transitory computer readable medium of claim 14, wherein the acquiring a training sample set comprises:

acquiring an unstructured/semi-structured document;

performing sentence segment on the document; and for each clause, performing word segmentation on the clause to obtain a word sequence, and perform entity labeling on the clause by a rule matching method to obtain an entity word, an entity category and an entity word position of the clause as labeling information.

17. The non-transitory computer readable medium of claim 15, wherein the converting the sample word sequence into a dictionary vector sequence through a pre-trained memory network comprises:

matching each sample word in the sample word sequence with a dictionary stored in the memory network to obtain a dictionary vector corresponding to at least one related word of each sample word;

for each sample word in the sample word sequence, fusing a dictionary vector corresponding to at least one related word of the sample word into a dictionary vector of the sample word through an attention mechanism; and forming the dictionary vector of each sample word in the sample word sequence into a dictionary vector sequence of the sample word sequence.

18. The non-transitory computer readable medium of claim 15, wherein the dictionary generation layer is a pre-trained classification model.

* * * * *